United States Patent [19]

Quinn et al.

[11] Patent Number: 4,638,312
[45] Date of Patent: Jan. 20, 1987

[54] ORDER ENTRY SYSTEM INCLUDING AN INTERACTIVE MENU DISPLAY

[75] Inventors: Bruce A. Quinn, Beavercreek; Scott N. Barton, Dayton, both of Ohio

[73] Assignee: NCR Corporation, Dayton, Ohio

[21] Appl. No.: 791,629

[22] Filed: Oct. 25, 1985

[51] Int. Cl.⁴ .......................... H04Q 7/00; E04H 3/04
[52] U.S. Cl. ................. 340/825.35; 235/383; 186/39; 186/53; 340/825.72; 340/706; 340/286 M
[58] Field of Search ............ 340/825.35, 825.19, 340/825.72, 706, 707, 286 R, 286 M, ; 186/41, 40, 39, 52, 53; 455/603; 235/375, 383, 385

[56] References Cited

U.S. PATENT DOCUMENTS

| | | | |
|---|---|---|---|
| 3,304,416 | 2/1967 | Wolf | 340/286 |
| 3,868,638 | 2/1975 | Johnson | 455/603 |
| 4,073,368 | 2/1978 | Mustapek | 186/53 |
| 4,104,617 | 8/1978 | Bean et al. | 455/603 |
| 4,128,757 | 12/1978 | Garner, Jr. | 235/383 |
| 4,209,255 | 6/1980 | Heynau et al. | 356/152 |
| 4,259,667 | 3/1981 | Weber | 340/707 |
| 4,268,826 | 5/1981 | Scott et al. | 340/707 |
| 4,303,916 | 12/1981 | Hakaridani et al. | 340/712 |
| 4,335,880 | 6/1982 | Meyer et al. | 273/310 |
| 4,451,895 | 5/1984 | Sliwkowski | 364/521 |
| 4,569,421 | 2/1986 | Sandstedt | 186/39 |

Primary Examiner—Donald J. Yusko
Attorney, Agent, or Firm—Wilbert Hawk, Jr.; Albert L. Sessler, Jr.; Elmer Wargo

[57] ABSTRACT

A method of ordering and an order entry system which includes a display showing, pictorially, the elements or items to be selected from a menu. An aiming selector is used to make the selections desired. Each item on the menu contains a light-responsive detector which is selected by aiming the aiming selector at the desired item. A first light signal from the selector falling on the detector of the desired item causes the item about to be selected to "flash" on the display, and a switch on the selector, when actuated, causes a second light signal to fall on the associated detector for the item to make the selection. A control element having a similar detector is similarly used to enter a command like "Total Up Order" which is used by the system to calculate the monetary value of the order.

13 Claims, 6 Drawing Figures

ORDER ENTRY SYSTEM INCLUDING AN INTERACTIVE MENU DISPLAY

BACKGROUND OF THE INVENTION

This invention relates to a method of ordering and an order entry system which may be used in a fast food restaurant, for example, and which system includes an interactive menu display.

One of the problems with placing an order at a drive-through station is that the quality of reproduction of the microphone/speaker system used to place an order is poor, and sometimes mistakes in orders occur because of the poor reproduction. In addition, customers are sometimes reluctant to use such an ordering system because of the difficulty in making themselves understood and because of the difficulty in hearing responses from the employees in the drive-in restaurant. As a result, people are uncomfortable talking to machines where such responses are prevalent.

SUMMARY OF THE INVENTION

In contrast with the above, the present invention utilizes a light-operated, aiming selector to select the items (like food, for example) desired and to actuate certain control functions associated with a data entry system.

In a preferred embodiment, the data entry system made according to this invention comprises a display having data entry elements and control elements positioned on said display and lighting means to light up said data entry and control elements when selected; each said data entry element and control element having a detector associated therewith; said display also having a first display area for indicating parameters such as the number of units of said data entry elements selected; an aiming selector having means for emitting first and second light signals directed at said data entry and control elements which are to be selected; control means for controlling the operation of said data entry system; said control means including means coupled to said detectors for producing first and second outputs in response to said first light signals and said second light signals, respectively, falling on said detectors; said first output being used by said control means and said lighting means to give a first indication that said aiming selector is directed at a particular one of said data entry or control elements, and said second output being used by said control means and said lighting means to give a second indication that said particular one of said data entry or control elements is selected for entry into said data entry system.

This invention also comprises a method of selecting an item from an array of items, with each item having a light detector and a source of light associated therewith, said method comprising the steps of: (a) aiming a ray of light having a first level at an item to be selected so as to activate the associated said light detector; (b) using the output of the light detector from step a to switch said source of light for said item from step a to a first state which indicates that said item is targeted for selection; and switching said ray of light to a second level while said source of light is in said first state to actuate the associated light detector to switch said source of light to a second state which indicates that said item which was targeted for selection is selected.

In the present invention, the response to making a selection is instantaneous, enabling a customer to know whether or not each item ordered is entered correctly.

Another advantage of this invention is that the ordering of items proceeds at a pace that is comfortable to the customer.

The present invention is also inexpensive to produce and simple to operate.

The present invention also provides the customer with a running total of the cost of the meal while ordering individual items in the meal.

These advantages and others will become more readily understood in connection with the following description, claims and drawing.

DETAILED DESCRIPTION OF THE INVENTION

Figure 1:
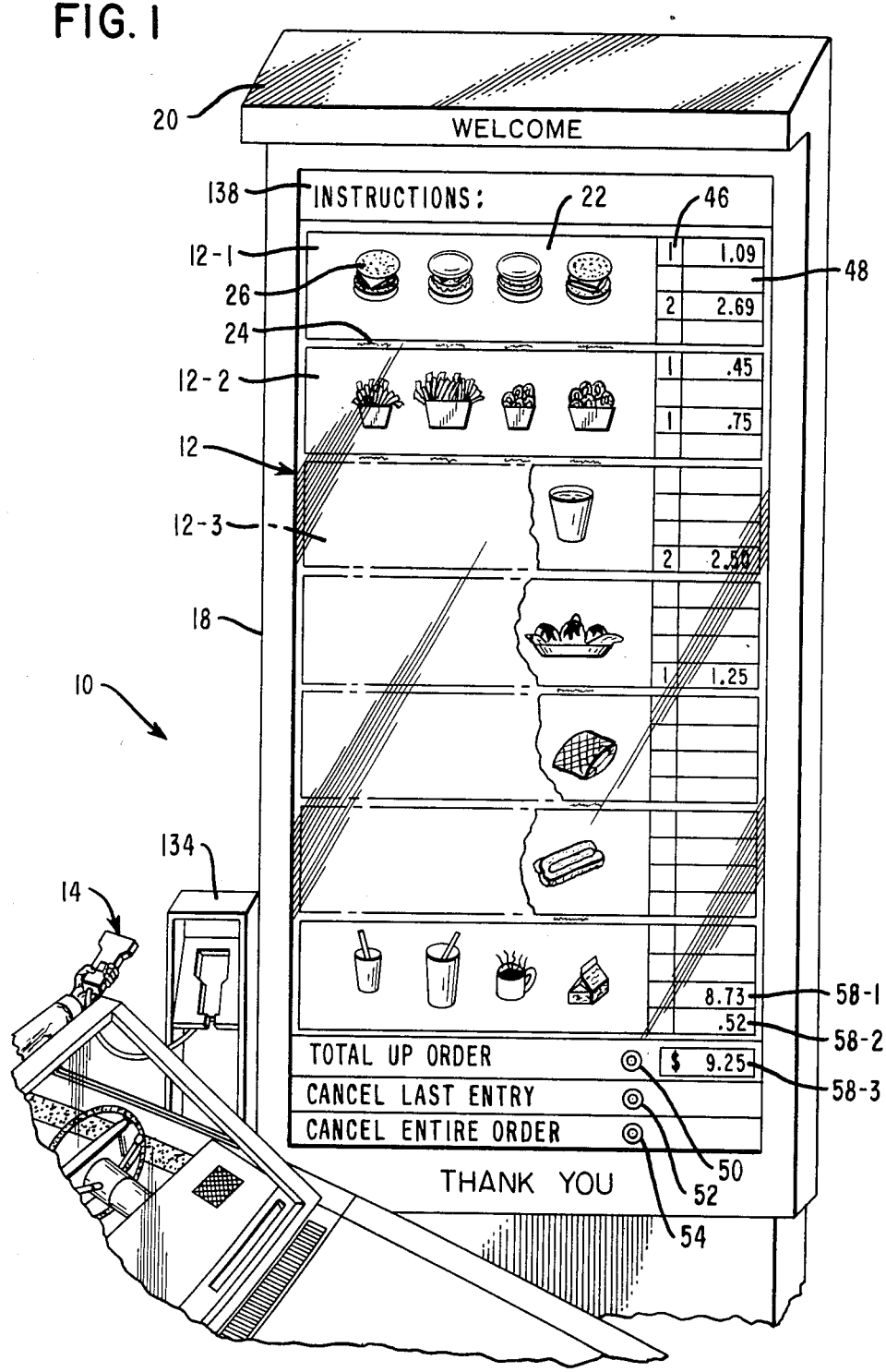
FIG. 1 is a general view, in perspective, showing a typical application of an order entry system made according to this invention and including an interactive menu display.

FIG. 1 is a general view in perspective, of a preferred embodiment of an order entry system 10 made according to this invention. The system 10 includes: the interactive menu display 12, which is used to facilitate order entry in a fast food restaurant, for example; means for selecting items to be purchased, including an aiming selector 14; and the means 16 (FIG. 2) for controlling the operation of the system 10.

Before describing the operation of the system 10, it appears useful to discuss first, the construction of the display 12. The display 12 is vertically positioned on a support 18 which has a roof portion 20 to provide weather protection and shade for the display 12 during daylight hours. The display 12 is also positioned on the premises of the restaurant, in the example described, so as to minimize the amount of sunlight or other bright lights falling on the display 12 and to provide access thereto by a customer driving his/her vehicle adjacent to the display 12.

The display 12 is comprised of a transparent plastic panel 22 with display areas 12-1, 12-2, 12-3, for example, being allocated, respectively, for hamburgers, chicken pieces, and french fried potatoes of different sizes in the embodiment described. Each display area, like 12-1, for example, has a line display 24 which is associated with the data entry element or item 26 to be sold, as seen best in FIG. 4. In this example, item 26 is a cheeseburger whose unit price is $1.39.

Figure 5:
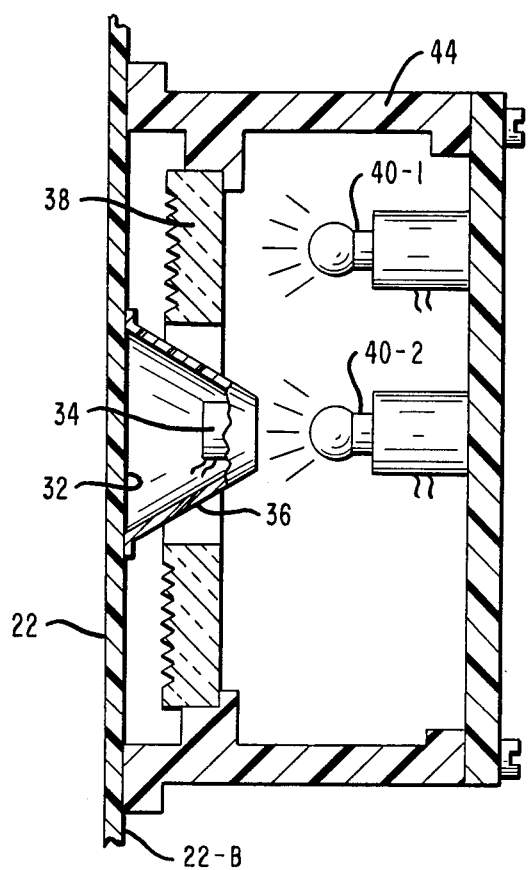
FIG. 5 is a cross-sectional view taken along the line 5—5 of FIG. 4.

The panel 22 is made of clear plastic which has the various images or items (seen in FIG. 1) silk-screened in color on the backside 22-B shown in FIG. 5. As an alternative, the panel 22 may be comprised of individual panels (not shown) for the various images or items so as to facilitate changing them. When the display 12 is lighted from the rear, the items appear in color to make the selection process attractive. The line display 24 may be printed and backlighted to be visible, or the display 24 may be part of the instruction displays shown collectively as 28 in FIG. 2; in this latter situation, the displays may be liquid crystal displays, for example, which are under the control of a controller 30 (FIG. 2) so as to facilitate changing the data included in the displays 28.

Figure 4:
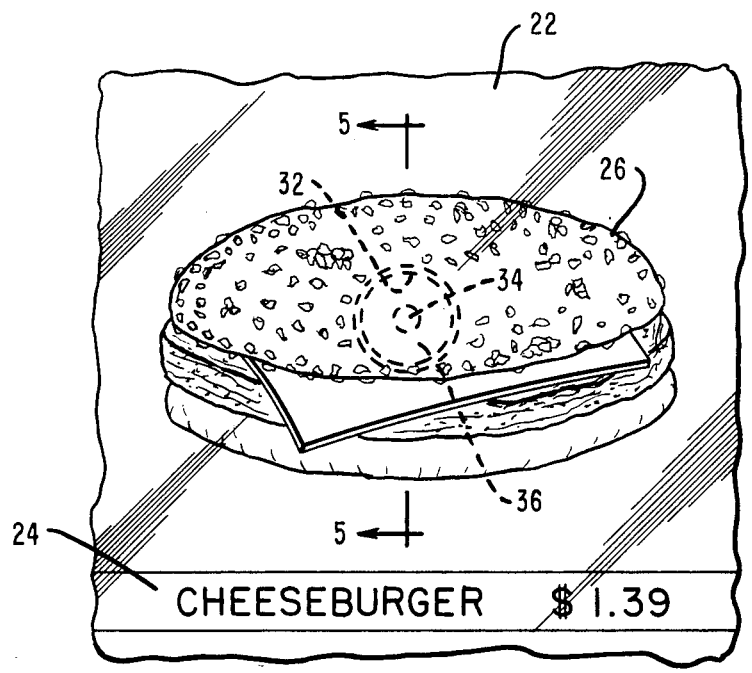
FIG. 4 is an enlarged schematic view of a portion of the menu display, showing one of the items to be selected.

Each item, like 26 shown in FIG. 4, for example, has a "bull's eye" or clear target area 32 located in the approximate center of the item to enable light from the aiming selector 14 to pass therethrough to register upon or coact with the associated light detector 34 when a selection is to be made. In the embodiment described, the detector 34 (FIG. 5) is shielded by a generally, conically-shaped shield 36 which prevents extraneous light from affecting the detector 34. A light-intensifying reflector 38, which is in the shape of a ring or washer, surrounds the shield 36 as shown in FIG. 5. The reflector 38 is conventional, and its function is to intensify the light from the light bulbs 40-1 and 40-2 so as to make the item 26 visibly lighted during the daytime in much the same manner as do the reflectors in the tail lights of vehicles. The elements described in this paragraph are enclosed in a cylindrical-type, opaque housing 44 to provide isolation from one another for each of the items, like 26. Light bulb 40-1 is used to provide an ambient light for the associated item 26, and light bulb 40-2 is used to provide a "flashing", high-level state or a constant, high-level state as will be described hereinafter. Two light bulbs 40-1 and 40-2 are shown in FIG. 5 for ease of illustration; however, the functions of these two bulbs can be combined into one, multi-filament bulb.

The display 12 (FIG. 1) also includes a display area 46 which indicates the number of units selected for that item and a display area 48 which indicates a subtotal price for the number of units selected. For each of the items, like item 26 shown on the display 12, there is associated therewith, a light detector 34, the light sources 40-1 and 40-2 (shown collectively as 40 in FIG. 2), a display of the number of items 46, and a display 48 for the cost per entry; these items are shown collectively in the dashed rectangular outline (FIG. 2) as select element #1. The display 12 is made up of a plurality of such elements ranging from select elements #1 through select element #N.

Figure 2:
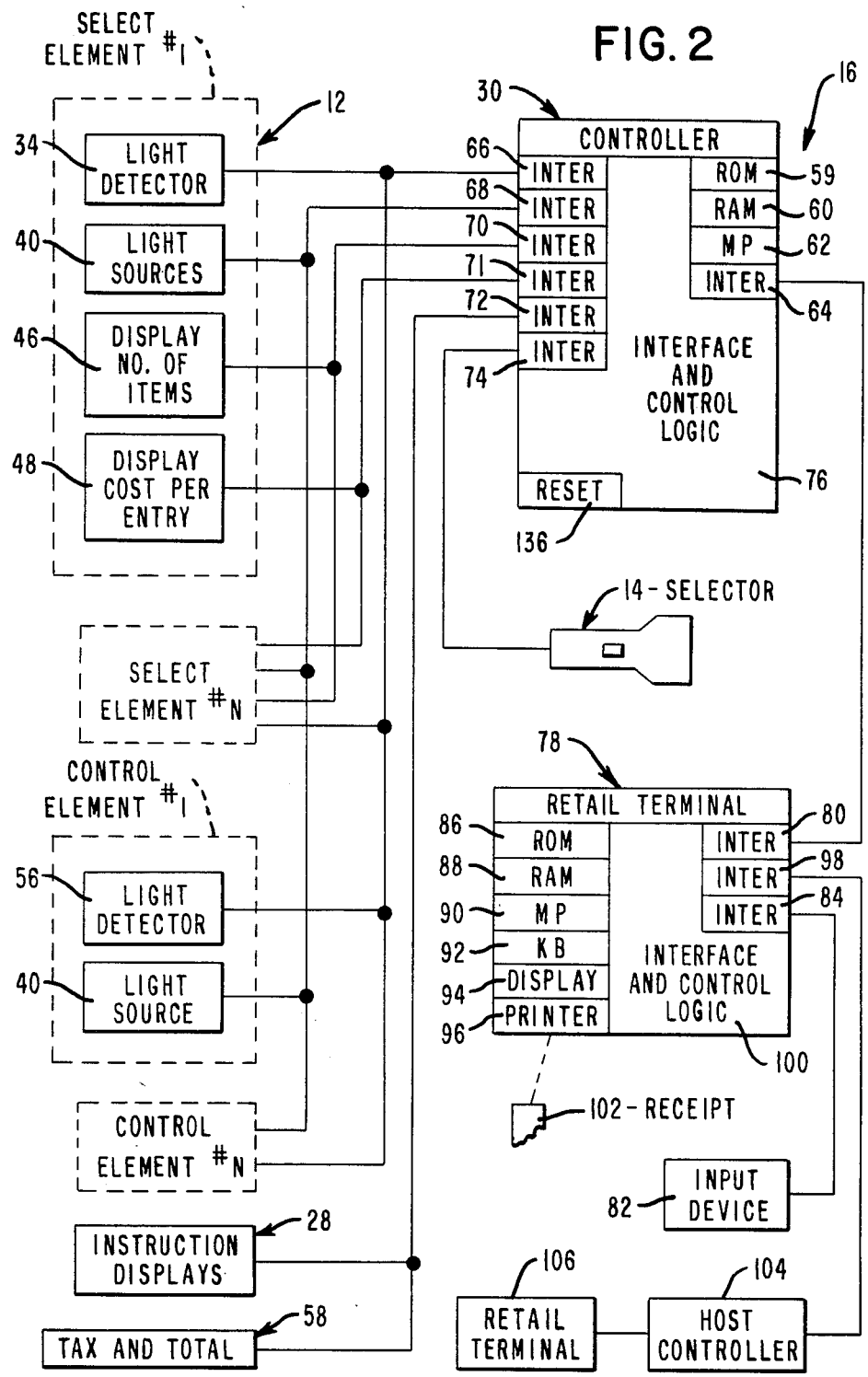
FIG. 2 is a general schematic diagram, in block form, showing the means for controlling the operation of the system shown in FIG. 1.

The display 12 also includes a plurality of transaction or control elements which are used when entering an order by a customer. For example, after a customer makes the various selections which he wants, he ends his transaction and obtains a total of his order by aiming the aiming selector 14 at the bull's eye or target area 50 (FIG. 1) associated with a control element or the transaction instruction "total up order". Other transaction or control elements include target areas 52 and 54 which are used, respectively, for the control instructions, "cancel last entry," and "cancel entire order". Each target area like 50, 52, and 54 includes a light detector 56 (FIG. 2) and the sources of light which are designated collectively as 40 (as previously described); these elements are shown collectively in the dashed, rectangular outline as "select element #1". The display 12 is made up of a plurality of such target areas or control elements ranging from control element #1 through control element #N as shown in FIG. 2. When the control element or target area 50 is energized, the subtotal amount of the order is shown at display line 58-1, the tax is shown on line 58-2, and the total amount of the order is shown on line 58-3. The tax and total lines are shown collectively as 58 in FIG. 2. The totals on lines 58-1, 58-2, and 58-3 may be running totals so as to inform the customer of his exact bill at any moment. In this case, when the target area 50 for "total up order" in energized, the customer's transaction is ended. The instruction displays 38 (FIG. 2) are utilized, as for example on line 138 in FIG. 1, to instruct the customer: to return the aiming selector 14 to its housing 134; that his order is being processed; and to please drive to the pick up window for picking up the selected items and making payment therefor.

The controller 30 (FIG. 2) alluded to earlier herein is conventional, and it includes a read only memory (ROM) 59, a random access memory (RAM) 60, a processor (MP) 62, a plurality of interfaces 64, 66, 68, 70, 72, and 74, and interface and control logic 76 which is used to couple together the various components mentioned. The operating programs for operating the controller 30 may reside in the ROM 59, or they may be loaded daily at start up into the RAM 60 as is typically done. In this regard, the controller 30 may be coupled to a retail terminal 78 via interface 80 as shown, and an input device 82 is also coupled to the retail terminal 78 via its interface 84. The input device 82 may be a tape cassette device, for example, which is used to load the operating program or programs into the retail terminal 78 which then transfers the necessary operating program to the controller 30; this operating program is used for controlling the operations of the order entry system 10 as will be described hereinafter.

The retail terminal 78 (FIG. 2) is a conventional terminal, like the NCR 2150 or 2160, which has been modified slightly to perform the additional functions to be discussed herein. The NCR 2150 or 2160 terminals are available from NCR Corp. of Dayton, Ohio. The terminal 78 also includes a ROM 86, RAM 88, MP 90, a keyboard KB 92, a display 94, a printer 96, interface 98, and interface and control logic 100 for interconnecting the various components shown. The retail terminal 78 is located at the pay station where a customer pays for his/her order after entering it. A receipt 102, which is printed by the printer 96, is given to the customer along with his/her ordered items when payment is made. The retail terminal 78 may be coupled to a host controller 104 as shown. Additional retail terminals shown as 106 may also be coupled to the host controller 104 as is typically done in a fast food restaurant so as to provide centralized control and accounting. The various components of the controller 30 and the retail terminal 78 are shown so as to illustrate their functions; however, the actual form of the controller 30 and terminal 78 may be different from that shown.

Having described, generally, the control means 16 for controlling the operation of order entry system 10, it appears appropriate to discuss the construction of the aiming selector 14 before discussing the operation of the order entry system 10.

Figure 3:
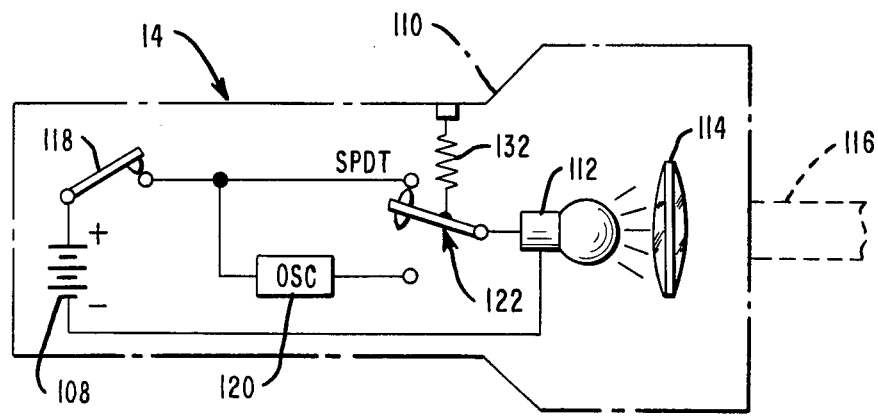
FIG. 3 is a general schematic diagram of the aiming selector used in FIG. 1.

The aiming selector 14 may receive electrical energy from the controller 30 as shown in FIGS. 1 and 2, or it may receive its energy from a battery 108 as shown in FIG. 3. The selector 14 includes a conventional housing 110 (shown diagrammatically) in which a source of light 112 and an optical lens system 114 are located to cooperate conventionally to produce a narrow, beam of light, as shown schematically by dashed line 116 when the source of light 112 is energized. In the embodiment described, the source of light 112 provides infra-red light. The aiming selector 14 also includes an on/off switch 118 which conserves the battery 108 when the selector 14 is not in use. An oscillator 120 is coupled to the switch 118 so that it is energized when the switch 118 is closed or on. The selector 14 also includes a single-pole, double-throw (SPDT) switch 122 which is used to put the selector 14 into one of two operating modes. When the switch 122 is in the first position or first mode shown in FIG. 3, the source of light 112 emits a constant light output. When the switch 122 is in the second mode (or opposite position from that shown), the source of light 112 emits an oscillating output which results in a lesser total output.

Figure 6:
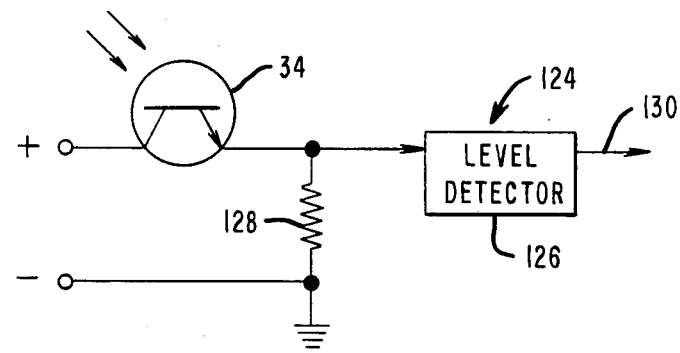
FIG. 6 is a schematic diagram showing a detector circuit used in the system.

The two modes of operation of the aiming selector 14 are detected by the light detectors 24, 34 and 56 (FIGS. 2 and 5) and the detector circuit 124 shown in FIG. 6. The detector circuit 124 is part of the interface 66 shown in FIG. 2, and the circuit 124 includes a conventional level detector 126 and resistor 128 which are coupled, conventionally, to the associated light detector 34 as shown in FIG. 6. When the aiming selector 14 is operated in the first mode (constant output), the level detector 126 produces a first signal or binary one at its output 130, and when the selector 14 is operated in the second mode (oscillating output), the level detector 126 produces a second lower signal or a binary zero at its output 130. In the embodiment described, the SPDT switch 122 is biased to the first position shown in FIG. 3 by a spring 132 to produce the first signal mentioned. When a selection of an item is to be made, the switch 122 is moved to the second position (opposite position to that shown in FIG. 3) to produce the oscillating or second signal as previously explained.

Having described the components utilized in the order entry system 10, it now appears appropriate to discuss the operation of the system 10. Assume that a customer drives up to the display 12 and picks up the aiming selector 14 from its protective housing 134 as shown in FIG. 1. The housing 134 has a reset switch 136 therein (shown in FIG. 2) to reset the system 10 whenever the aiming selector 14 is withdrawn from the housing 134 after being returned thereto by the prior customer. The general instructions for operating the system 10 are shown on display line 138 (FIG. 1) which is part of the instruction displays shown collectively as 28 in FIG. 2. The first instruction which is given on display line 138 is to "Point Selector", i.e., point the selector 14 at the item to be selected. A customer may then direct the aiming selector 14 over the display 12 to test his accuracy in aiming the selector 14. In this regard, when the selector 14 is aimed or targeted at a particular item, like the cheeseburger 26, for example, the infra-red light from the selector 14 interacts with the infra-red light detector 34 causing the light bulb 40-2 (FIG. 5) to flash or be on intermittently. This lets the customer know what his targeted or selected item is. If the customer wishes to order one of the items, like 26, which is flashing, the customer then momentarily actuates the SPDT switch 122 on the selector 114, moving it to the second position or mode of operation. In the second mode, the oscillator 120 causes the output of the source of light 112 to oscillate, which in turn causes the light detector 34 to change, resulting in the output 130 of the level detector 126 changing to the second signal or binary zero. The binary zero from the level detector 126 is interpreted by the operating program residing in the ROM 59 or RAM 60 of the controller 30 as recording a selection. The controller 30 then causes light bulb 40-2 (FIG. 5) to remain on continuously, indicating that one of item 26 (a cheeseburger) has been selected. A "1" shows up in display 46 (FIG. 1) and $1.39 is displayed at display 48, indicating the cost of one item or unit. If the customer wishes to order an additional item 26 (a cheeseburger in the embodiment described), he momentarily energizes SPDT switch 122 a second time to repeat the process described. In this regard, the light bulb 40-2 flashes once (since it was already on) and remains on. The display 46 will indicate a "2" for the number of that item selected, and the display 48 will indicate $2.78 instead of $1.39 as the cost of two such items. The customer is then instructed by the display line 138 to scan the display 12 to select additional items by the process just described.

When a customer has selected all the items, like 26 (FIG. 1) in the quantities which he intends to purchase, he then points the aiming selector 14 at the target area 50 (FIG. 1) which is an instruction to "Total Up Order". It should be recalled that the target area 50 (FIG. 1) represents one of the control elements shown in FIG. 2, as for example, control element #1. The control elements #1 through #N have suitable addresses associated therewith to enable the controller 30 to identify the particular control element being actuated; the same is true for the select elements #1 through #N and the associated displays 28 and 58. When the target area 50 is energized, the controller 30 provides a sub-total (on line 58-1) for the cost of all the items being ordered, figures the tax where appropriate and provides a tax total on line 58-2, and presents a total bill on line 58-3. In addition, the list of items in the order is displayed on the display 94 of the retail terminal 78, and the printer 96 prints the list of items and the total cost of the order. The items in the order may be filled from the receipt 102 from the printer 96 although a duplicate copy stored in the retail terminal 78 may be used. When the order is filled, the ordered items and the receipt 102 are given to the customer upon payment for the order.

What is claimed is:
1. A data entry system comprising:
   a display having data entry elements and control elements positioned on said display and lighting means to light up said data entry and control elements when selected; each said data entry element and control element having a detector associated therewith; said display also having a first display area for indicating parameters such as the number of units of said data entry elements selected;
   an aiming selector having means for emitting first and second light signals directed at said data entry and control elements which are to be selected;
   control means for controlling the operation of said data entry system;
   said control means including means coupled to said detectors for producing first and second outputs in response to said first light signals and said second light signals, respectively, falling on said detectors;
   said first output being used by said control means and said lighting means to give a first indication that said aiming selector is directed to a particular one of said data entry or control elements, and said second output being used by said control means and said lighting means to give a second indication that said particular one of said data entry or control elements is selected for entry into said data entry system.

2. The data entry system as claimed in claim 1 in which said display includes a pictorial representation for at least some of said data entry elements with a said detector being located within each said pictorial representation.

3. The data entry system as claimed in claim 2 in which said means for emitting first and second light signals comprises:
   a source of electrical potential;
   an infrared light source;
   a lens system for producing a narrow beam of light in cooperation with said light source;
   an oscillator coupled to said source of electrical potential; and
   a switch moveable between first and second positions for coupling said light source to said source of electrical potential to produce said first light signal when said switch is in said first position and for coupling said light source to said oscillator to produce said second light signal when said switch is in said second position.

4. An order entry system comprising:
   a display having order entry elements and control elements positioned on said display and lighting means to light up said order entry and control elements when selected; each said order entry element and control element having a detector associated therewith; said display also having a first display area for indicating the number of units of each said order entry element which is selected and the monetary value of the units selected;
   an aiming selector having means for emitting first and second light signals at said order entry elements and control elements which are to be selected;
   control means for controlling the operation of said order entry system;
   said control means including means coupled to said detectors for producing first and second outputs in response to said first light signals and said second light signals, respectively, falling on said detectors;
   said first output being used by said control means and said lighting means to give a first indication that said aiming selector is directed at a particular one of said order entry elements or said control elements, and said second output being used by said control means and said lighting means to give a second indication that said particular one of said order entry elements or said control elements is selected; and
   said control means also including means for totaling up the monetary value of all the order entry elements selected.

5. The data entry system as claimed in claim 4 in which said display includes a pictorial representation for at least some of said data entry elements with a said detector being located within each said pictorial representation.

6. The data entry system as claimed in claim 5 in which said display includes a means for indicating a unit price for each said order entry element, and in which one of said control elements represents an instruction to total up the monetary value of all the order entry elements selected.

7. The data entry system as claimed in claim 6 in which said means for emitting first and second light signals comprises:
   a source of electrical potential;
   an infrared light source;
   a lens system for producing a narrow beam of light in cooperation with said light source;
   an oscillator coupled to said source of electrical potential; and
   a switch moveable between first and second positions for coupling said light source to said source of electrical potential to produce said first light signal when said switch is in said first position and for coupling said light source to said oscillator to produce said second light signal when said switch is in said second position.

8. The order entry system as claimed in claim 4 in which said display is vertically oriented and said aiming selector has a housing which enables it to be aimed at said display by a person using said order entry system.

9. The order entry system as claimed in claim 8 in which said aiming selector includes a stationary housing which is positioned relative to said display to enable a person using said system and seated in a vehicle to pick up said aiming selector, use it, and return it to said stationary housing while seated in said vehicle.

10. The order entry system as claimed in claim 5 in which said pictorial representation is in the form of a food item at a fast-food restaurant.

11. A method of selecting an item from an array of items, with each item having a light detector and a source of light associated therewith, said method comprising the steps of:
   (a) aiming a ray of light having a first level at an item to be selected so as to actuate the associated said light detector;
   (b) using the output of the light detector from step a to switch said source of light for said item from step a to a first state which indicates that said item is targeted for selection; and
   (c) switching said ray of light to a second level while said source of light is in said first state to actuate the associated light detector to switch said source of light to a second state which indicates that said item which was targeted for selection is selected.

12. In an item ordering system, the method of ordering items at a fast food restaurant comprising the steps of:
   (a) presenting items to be ordered on a menu which contains an array of said items and also contains control elements for controlling the operation of said system, with each said item and control element having a light detector and a source of light associated therewith;
   (b) aiming a ray of light of a first level at an item to be ordered to energize the associated said light detector causing the associated indicator to indicate that the item is targeted to be ordered;
   (c) changing the ray of light to a second level while aiming at said item which is targeted to thereby order said item;
   (d) repeating steps b and c, if necessary, until the ordering of items is complete; and
   (e) repeating steps b and c for a control element to control the operation of said ordering system.

13. The method as claimed in claim 12 in which said aiming step is effected by using infrared light.

* * * * *